(12) United States Patent
Clement

(10) Patent No.: US 12,467,258 B2
(45) Date of Patent: *Nov. 11, 2025

(54) BOARD AND METHOD OF MANUFACTURING A BOARD

(71) Applicant: UNILIN, BV, Wielsbeke (BE)

(72) Inventor: Benjamin Clement, Waregem (BE)

(73) Assignee: UNILIN, BV, Wielsbeke (BE)

( * ) Notice: Subject to any disclaimer, the term of this patent is extended or adjusted under 35 U.S.C. 154(b) by 584 days.

This patent is subject to a terminal disclaimer.

(21) Appl. No.: 16/496,169

(22) PCT Filed: Mar. 21, 2018

(86) PCT No.: PCT/IB2018/051903
§ 371 (c)(1),
(2) Date: Sep. 20, 2019

(87) PCT Pub. No.: WO2018/172959
PCT Pub. Date: Sep. 27, 2018

(65) Prior Publication Data
US 2020/0157812 A1    May 21, 2020

Related U.S. Application Data

(60) Provisional application No. 62/564,719, filed on Sep. 28, 2017.

(30) Foreign Application Priority Data

Mar. 21, 2017  (BE) .................................. 2017/5181

(51) Int. Cl.
*E04C 2/26* (2006.01)
*E04C 2/04* (2006.01)
(Continued)

(52) U.S. Cl.
CPC ................ *E04C 2/26* (2013.01); *E04C 2/043* (2013.01); *E04C 2/044* (2013.01); *E04C 2/06* (2013.01); *E04C 2/10* (2013.01)

(58) Field of Classification Search
CPC ....... Y10T 428/24942; Y10T 428/2495; Y10T 428/24967; Y10T 428/24975;
(Continued)

(56) References Cited

U.S. PATENT DOCUMENTS 3,849,235 A    11/1974  Gwynne
4,112,176 A     9/1978  Bailey
(Continued)

FOREIGN PATENT DOCUMENTS

CN    101084125 A    12/2007
CN    201106259 Y     8/2008
(Continued)

OTHER PUBLICATIONS

Machine translation (Espacenet) of JP 10-193503 A. Translated Sep. 23, 2022. (Year: 2022).*
(Continued)

*Primary Examiner* — Maria V Ewald
*Assistant Examiner* — Ethan A. Utt
(74) *Attorney, Agent, or Firm* — Workman Nydegger

(57) ABSTRACT

A board includes at least a substrate which is formed at least of a gypsum-based and/or cement-based basic material layer with a compressive strength of 30 kg/cm2 and a resin-based covering provided on at least one side of the substrate, in the form of a laminate layer directly pressed onto the substrate.

13 Claims, 1 Drawing Sheet

(51) Int. Cl.
*E04C 2/06* (2006.01)
*E04C 2/10* (2006.01)

(58) Field of Classification Search
CPC ..... Y10T 428/24983; Y10T 428/24992; Y10T 428/26; Y10T 428/266; Y10T 428/269; Y10T 428/30; Y10T 428/31627; Y10T 428/31942; Y10T 428/31949; Y10T 428/31957; Y10T 428/31964; Y10T 428/24355; Y10T 428/24479; Y10T 428/24612; Y10S 428/92; Y10S 428/921; B32B 3/00; B32B 3/26; B32B 3/263; B32B 3/30; B32B 5/00; B32B 5/02; B32B 5/22; B32B 5/24; B32B 5/26; B32B 5/28; B32B 9/00; B32B 9/005; B32B 9/007; B32B 9/02; B32B 9/04; B32B 9/045; B32B 9/047; B32B 9/06; B32B 13/00; B32B 13/02; B32B 13/04; B32B 13/08; B32B 13/12; B32B 13/14; B32B 17/00; B32B 17/02; B32B 17/04; B32B 17/06; B32B 17/065; B32B 17/067; B32B 17/10; B32B 27/00; B32B 27/02; B32B 27/04; B32B 27/06; B32B 27/08; B32B 27/10; B32B 27/12; B32B 27/42; B32B 29/00; B32B 29/002; B32B 29/005; B32B 29/02; B32B 33/00; B32B 2419/00; B32B 2419/04; E04B 1/00; E04B 1/02; E04B 1/04; E04B 1/12; E04B 1/14; E04B 1/62; E04B 1/92; E04B 1/94; E04B 1/941; E04B 1/942; E04B 1/943; E04B 1/944; E04B 2/00; E04B 2/72; E04B 2/723; E04B 5/00; E04B 5/02; E04B 5/04; E04B 9/00; E04B 9/04; E04B 9/045; E04B 2103/00; E04B 2103/02; E04B 2103/04; E04C 2/00; E04C 2/02; E04C 2/04; E04C 2/043; E04C 2/044; E04C 2/049; E04C 2/06; E04C 2/10; E04C 2/16; E04C 2/18; E04C 2/20; E04C 2/22; E04C 2/24; E04C 2/243; E04C 2/26; E04C 2/284; E04C 2/288; E04C 2/2885; E04C 2/30; E04C 2/40; E04C 2/44; E04C 2/46; E04C 2/50; E04F 15/00; E04F 15/02; E04F 15/02161; E04F 15/02172; E04F 15/022; E04F 15/08; E04F 15/10; E04F 15/102; E04F 15/105; E04F 15/107; E04F 2290/04; E04F 2290/045; E04F 2290/047
USPC ....... 428/212, 213, 215, 216, 217, 218, 220, 428/332, 337, 339, 408, 426, 436, 524, 428/525, 526, 528, 530, 532, 537.1, 428/537.5, 537.7, 688, 689, 702, 703, 428/920, 921, 141, 156, 172; 52/309.1, 52/309.13, 309.15, 309.16, 309.17, 52/506.01
See application file for complete search history.

(56) References Cited

U.S. PATENT DOCUMENTS

| | | | |
|---|---|---|---|
| 5,194,323 A | 3/1993 | Savoy | |
| 5,256,222 A | 10/1993 | Shepard et al. | |
| 5,425,986 A | 6/1995 | Guyette | |
| 5,565,252 A * | 10/1996 | Finestone | B65D 27/00 52/309.3 |
| 5,740,858 A | 4/1998 | Ingram | |
| 6,006,486 A | 12/1999 | Moriau et al. | |
| 6,205,729 B1 | 3/2001 | Porter | |
| 6,235,367 B1 | 5/2001 | Holmes et al. | |
| 6,342,284 B1 | 1/2002 | Yu et al. | |
| 6,479,584 B1 | 11/2002 | Nakagawa et al. | |
| 7,337,588 B1 | 3/2008 | Moebus | |
| 7,644,548 B2 | 1/2010 | Guevara et al. | |
| 7,699,929 B2 | 4/2010 | Guevara et al. | |
| 7,744,692 B2 | 6/2010 | Guevara et al. | |
| 7,763,345 B2 | 7/2010 | Chen et al. | |
| 7,827,749 B2 | 11/2010 | Groeke et al. | |
| 8,029,617 B2 | 10/2011 | Guevara et al. | |
| 8,071,193 B2 | 12/2011 | Windmöller | |
| RE43,253 E | 3/2012 | Adely et al. | |
| 8,176,698 B2 | 5/2012 | Lewark | |
| 8,549,807 B2 | 10/2013 | Meersseman et al. | |
| 8,617,690 B2 | 12/2013 | Eisermann | |
| 8,950,148 B2 | 2/2015 | De Boe | |
| 9,506,256 B2 | 11/2016 | Thiers | |
| 9,757,974 B2 | 9/2017 | Kalwa | |
| 9,828,777 B2 | 11/2017 | Dohring | |
| 10,214,916 B2 | 2/2019 | Schulte | |
| 10,677,275 B1 | 6/2020 | Caselli et al. | |
| 10,883,276 B2 | 1/2021 | Lingg | |
| 11,124,973 B2 * | 9/2021 | Clement | B32B 13/04 |
| 11,454,035 B2 | 9/2022 | Lingg | |
| 11,454,036 B1 | 9/2022 | Morris et al. | |
| 2002/0046526 A1 * | 4/2002 | Knauseder | C09J 5/04 52/581 |
| 2002/0090871 A1 * | 7/2002 | Ritchie | E04C 2/043 442/25 |
| 2002/0146954 A1 | 10/2002 | Drees et al. | |
| 2002/0179220 A1 | 12/2002 | Cottier et al. | |
| 2003/0033777 A1 | 2/2003 | Thiers et al. | |
| 2003/0101681 A1 | 6/2003 | Tychsen | |
| 2004/0255541 A1 | 12/2004 | Thiers et al. | |
| 2005/0055931 A1 | 3/2005 | Rochette | |
| 2005/0064164 A1 | 3/2005 | Dubey et al. | |
| 2005/0070636 A1 | 3/2005 | Lee et al. | |
| 2006/0217464 A1 | 9/2006 | Guevara et al. | |
| 2006/0225618 A1 | 10/2006 | Guevara et al. | |
| 2007/0110970 A1 | 5/2007 | Dubey | |
| 2007/0207296 A1 | 9/2007 | Eisermann | |
| 2008/0099133 A1 * | 5/2008 | Stivender | B28C 5/404 156/500 |
| 2008/0106568 A1 | 5/2008 | Albrecht et al. | |
| 2008/0127607 A1 | 6/2008 | Schiffmann et al. | |
| 2008/0138560 A1 | 6/2008 | Windmoller | |
| 2008/0155930 A1 | 7/2008 | Pervan et al. | |
| 2008/0299372 A1 | 12/2008 | Stidham et al. | |
| 2008/0314295 A1 | 12/2008 | Guevara et al. | |
| 2009/0000232 A1 | 1/2009 | Thiers et al. | |
| 2009/0004378 A1 | 1/2009 | Jones | |
| 2009/0031662 A1 * | 2/2009 | Chen | E04F 15/02 52/515 |
| 2009/0130377 A1 | 5/2009 | Samanta et al. | |
| 2009/0162651 A1 | 6/2009 | Rios et al. | |
| 2009/0193741 A1 | 8/2009 | Cappelle | |
| 2009/0249731 A1 | 10/2009 | Cappelle | |
| 2009/0260313 A1 | 10/2009 | Segaert | |
| 2009/0320402 A1 | 12/2009 | Schacht et al. | |
| 2010/0009102 A1 | 1/2010 | Vermeulen | |
| 2010/0064943 A1 | 3/2010 | Guevara et al. | |
| 2010/0230035 A1 * | 9/2010 | Frank | B28B 7/364 264/162 |
| 2010/0247937 A1 | 9/2010 | Liu et al. | |
| 2011/0047913 A1 | 3/2011 | Kim et al. | |
| 2011/0167744 A1 | 7/2011 | Whispell et al. | |
| 2011/0173911 A1 | 7/2011 | Propst | |
| 2011/0271624 A1 | 11/2011 | Wilson et al. | |
| 2012/0031034 A1 | 2/2012 | Culpepper | |
| 2012/0042595 A1 | 2/2012 | De Boe | |
| 2012/0103722 A1 | 5/2012 | Clausi et al. | |
| 2012/0159765 A1 | 6/2012 | Propst | |
| 2012/0276348 A1 | 11/2012 | Clausi et al. | |
| 2013/0104478 A1 | 5/2013 | Meersseman et al. | |
| 2013/0104485 A1 | 5/2013 | Meerseman et al. | |
| 2013/0126066 A1 | 5/2013 | Eisermann | |
| 2013/0139727 A1 * | 6/2013 | Constantz | C04B 11/00 106/656 |

(56) References Cited

U.S. PATENT DOCUMENTS

| | | |
|---|---|---|
| 2013/0199121 A1 | 8/2013 | Grau |
| 2013/0274410 A1 | 10/2013 | Miyafuji et al. |
| 2014/0162031 A1* | 6/2014 | Griffin, Jr. ............ B44C 5/0469 428/201 |
| 2014/0242342 A1 | 8/2014 | Vandevoorde et al. |
| 2015/0010767 A1* | 1/2015 | Sang ................. C08B 30/14 127/38 |
| 2015/0047281 A1 | 2/2015 | Cole et al. |
| 2015/0096249 A1 | 4/2015 | Amend |
| 2015/0197943 A1 | 7/2015 | Ziegler et al. |
| 2015/0233127 A1 | 8/2015 | Dohring |
| 2015/0258716 A1 | 9/2015 | Hanning |
| 2015/0314639 A1 | 11/2015 | Kalwa |
| 2015/0337542 A1 | 11/2015 | Cappelle et al. |
| 2015/0368912 A1 | 12/2015 | Baert et al. |
| 2016/0369507 A1 | 12/2016 | Pervan et al. |
| 2016/0375674 A1 | 12/2016 | Schulte |
| 2017/0136725 A1 | 5/2017 | Granados Pelaez et al. |
| 2017/0268118 A1 | 9/2017 | Ono et al. |
| 2018/0119429 A1 | 5/2018 | Schulte |
| 2018/0127987 A1 | 5/2018 | Bradway et al. |
| 2018/0134016 A1 | 5/2018 | Burns et al. |
| 2018/0195291 A1 | 7/2018 | Loncke et al. |
| 2018/0258651 A1 | 9/2018 | Meersseman et al. |
| 2018/0283014 A1 | 10/2018 | Hodgkins et al. |
| 2018/0339504 A1 | 11/2018 | Ziegler et al. |
| 2019/0024359 A1 | 1/2019 | Hume |
| 2019/0040635 A1 | 2/2019 | Baert et al. |
| 2019/0085566 A1 | 3/2019 | Lingg |
| 2019/0119439 A1 | 4/2019 | Queen et al. |
| 2021/0115674 A1 | 4/2021 | Lingg |
| 2022/0018136 A1 | 1/2022 | Baert et al. |
| 2022/0042671 A1 | 2/2022 | Young |

FOREIGN PATENT DOCUMENTS

| | | | |
|---|---|---|---|
| CN | 101736873 A | 6/2010 | |
| CN | 102421973 A | 4/2012 | |
| CN | 103492175 A | 1/2014 | |
| CN | 104703791 A | 6/2015 | |
| CN | 104870203 A | 8/2015 | |
| DE | 7804594 U1 | 6/1978 | |
| DE | 7904458 U1 | 8/1979 | |
| DE | 3310281 A1 | 10/1984 | |
| DE | 8615282 U1 | 5/1996 | |
| DE | 10156775 A1 | 6/2003 | |
| DE | 10201246 A1 | 7/2003 | |
| DE | 102012000468 A1 | 7/2013 | |
| EP | 0206832 A2 | 12/1986 | |
| EP | 0843763 B1 | 10/2000 | |
| EP | 1085138 A2 | 3/2001 | |
| EP | 1367194 A2 | 12/2003 | |
| EP | 1520947 A1 | 4/2005 | |
| EP | 1813425 A2 | 8/2007 | |
| EP | 1875011 A1 | 1/2008 | |
| EP | 1938963 A1 | 7/2008 | |
| EP | 2060389 A1 | 5/2009 | |
| EP | 2202056 A1 | 6/2010 | |
| EP | 2230364 A1 | 9/2010 | |
| EP | 2248665 A1 | 11/2010 | |
| EP | 2730429 A1 | 5/2014 | |
| EP | 2905376 A1 * | 8/2015 | ............ B32B 21/02 |
| EP | 2957691 A1 | 12/2015 | |
| EP | 3222795 A1 | 9/2017 | |
| JP | 10193503 A * | 7/1998 | |
| JP | H10193503 A | 7/1998 | |
| JP | 2008536783 A | 9/2008 | |
| JP | 2009138476 A | 6/2009 | |
| KR | 950012786 B1 * | 10/1995 | ............ B32B 19/04 |
| RU | 2598437 C1 | 9/2016 | |
| WO | 9747834 A1 | 12/1997 | |
| WO | 0148332 A1 | 7/2001 | |
| WO | 0175247 A1 | 10/2001 | |
| WO | 2005031084 A1 | 4/2005 | |
| WO | 2006102634 A2 | 9/2006 | |
| WO | 2007020657 A1 | 2/2007 | |
| WO | 2008061791 A1 | 5/2008 | |
| WO | WO-2008078181 A1 * | 7/2008 | ............... C09D 5/00 |
| WO | 2008101679 A2 | 8/2008 | |
| WO | 2012061300 A2 | 5/2012 | |
| WO | 2014053186 A1 | 4/2014 | |
| WO | 2014108875 A1 | 7/2014 | |
| WO | 2016154667 A1 | 10/2016 | |
| WO | 2016155696 A1 | 10/2016 | |
| WO | 2016156506 A1 | 10/2016 | |
| WO | 2016209942 A1 | 12/2016 | |
| WO | 2017001976 A1 | 1/2017 | |
| WO | 2017133804 A1 | 8/2017 | |
| WO | 2017163193 A1 | 9/2017 | |
| WO | 2018138273 A1 | 8/2018 | |

OTHER PUBLICATIONS

Machine translation (Google patents) of KR 95-0012786 B1. Translated Jul. 21, 2025. (Year: 2025).*

International Search Report & Written Opinion from PCT Application No. PCT/IB2018/051903, Dec. 20, 2018.

* cited by examiner

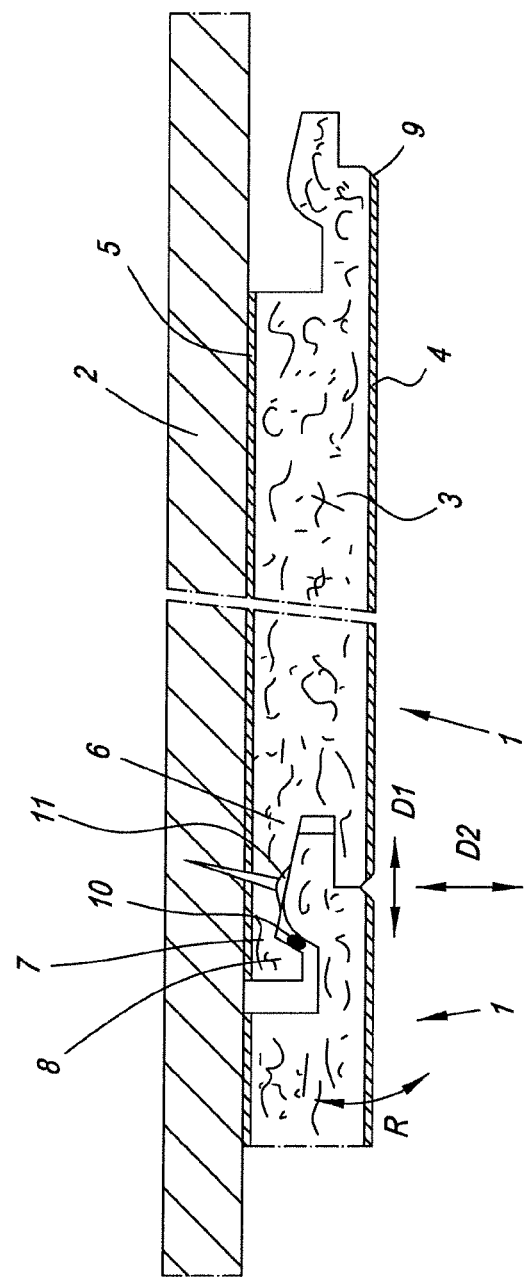

BOARD AND METHOD OF MANUFACTURING A BOARD

This application claims the benefit under 35 U.S.C. 119(e) to the U.S. provisional applications U.S. 62/564,719 filed on Sep. 28, 2017.

BACKGROUND OF THE INVENTION

Field of the Invention

This invention relates to a board and a method of manufacturing such board.

More particularly, the invention relates to a board which is intended for forming a wall, floor or ceiling surface. In other words, this relates to a panel in the form of a wall panel and/or floor panel and/or ceiling panel. More particularly, it relates to such board or panel which is of the type that is intended at least for being applied in interior applications, in other words, for forming a floor covering, wall covering or ceiling covering.

SUMMARY OF THE DISCLOSURE

The invention aims at a board which, on the one hand, offers a good resistance against fire and, on the other hand, is advantageous in respect to production features and production possibilities, as well as in respect to processing.

To this aim, the invention relates to a board as described in the appended claims. Herein, several independent aspects will be covered, which are defined in the form of the appended independent claims.

To this aim, the invention relates to boards as defined in the following numbered paragraphs:

1.—Board, characterized in that it consists at least of a substrate which is formed at least of a gypsum-based and/or cement-based basic material layer with a compressive strength of at least 30 kg/cm² and a resin-based covering provided on at least one side of the substrate, in the form of a laminate layer directly pressed onto the substrate, also named "DPL" (Direct Pressure Laminate).
2.—Board according to paragraph 1, characterized in that the directly pressed laminate layer is a layer which has been pressed with a pressure of more than 25 kg/cm².
3.—Board according to any of the preceding numbered paragraphs, characterized in that the basic material layer has a compressive strength of at least 40 and still better at least 50 kg/cm².
4.—Board according to any of the preceding numbered paragraphs, characterized in that the basic material layer has a compressive strength of at least 70 kg/cm².
5.—Board according to any of the preceding numbered paragraphs, characterized in that the basic material layer has a compressive strength in the order of magnitude of 90 kg/cm² or more.
6.—Board according to any of the preceding numbered paragraphs, characterized in that the directly pressed laminate layer is a layer which has been pressed with a pressure of more than 30 kg/cm² and still better of more than 35 kg/cm², and that the compressive strength of the board is higher than that value.
7.—Board according to any of the preceding numbered paragraphs, characterized in that the basic material layer is a so-called highly compacted gypsum and/or cement board.
8.—Board according to any of the preceding numbered paragraphs, characterized in that the basic material layer contains reinforcement material, such as reinforcement fibers, and preferably consists of a gypsum fiber board or fiber cement board, and more particularly of a highly compacted gypsum fiber board or highly compacted fiber cement board.
9.—Board according to paragraph 8, characterized in that the fibers are present in the basic material layer substantially over the entire thickness of this layer.
10.—Board according to paragraphs 8 or 9, characterized in that the fibers consist of synthetic fibers in general and/or natural fibers in general and/or wood fibers and/or paper fibers and/or carbon fibers and/or glass fibers.
11.—Board according to any of the preceding numbered paragraphs, characterized in that the aforementioned resin-based covering is situated at that side of the board which is intended for forming the front side.
12.—Board according to any of the preceding numbered paragraphs, characterized in that a resin bond is continuously present from on the resin-based covering up into the gypsum-based and/or cement-based material of the basic material layer.
13.—Board according to paragraph 12, characterized in that the resin of said resin bond extends at least up to a depth in said gypsum-based and/or cement-based material which is at least 0.5 millimeters and still better is at least 1 millimeter.
14.—Board according to any of the preceding numbered paragraphs, characterized in that the substrate, at the side on which the resin-based covering is provided, is free from a cover sheet, such that the resin-based covering then is present directly on said basic material layer.
15.—Board according to any of the paragraphs 1 to 13, characterized in that the aforementioned substrate, at least on the side on which the resin-based covering is provided, comprises a cover sheet, which consists of one or more layers of paper or cardboard or consists of another material, and wherein the resin-based covering is provided directly or indirectly on the paper or cardboard layer or other cover sheet.
16.—Board according to paragraph 15, characterized in that the paper or cardboard layer has a thickness smaller than or equal to 0.18 millimeters and still better smaller than or equal to 0.1 millimeter.
17.—Board according to any of the preceding numbered paragraphs, characterized in that the substrate is provided with an adherence-increasing layer, which improves the adherence of the resin-based covering.
18.—Board according to any of the preceding numbered paragraphs, characterized in that the aforementioned resin-based material layer is formed of one or more material sheets pressed by means of resin.
19.—Board according to paragraph 18, characterized in that at least one of the material sheets, and preferably all of them, consists, consist, respectively, of paper.
20.—Board according to paragraph 18 or 19, characterized in that the resin-based material layer is at least formed of one or more resin-impregnated sheets, more particularly paper sheets, which are pressed on the substrate.
21.—Board according to paragraph 20, characterized in that the resin-based material layer is at least composed of one of the following layers, or comprises a combination of any two of the following layers or all three of the following layers:
- a sheet impregnated with resin, which sheet functions as a basic or lower layer;
- a sheet impregnated with resin, which sheet functions as a decor layer;
- a sheet impregnated with resin, which sheet functions as an overlay and preferably is provided with particles which increase the wear resistance, such as corundum.

22.—Board according to any of the preceding numbered paragraphs, characterized in that it is provided with a decor layer, whether or not with a pattern.

23.—Board according to paragraph 22, characterized in that the pattern is a print directly provided on the board, for example, realized by means of a digital printer, for example, inkjet printer.

24.—Board according to any of the preceding paragraphs, characterized in that in the upper side thereof a relief is provided, formed by embossments, preferably realized when compressing the laminate layer.

25.—Board according to any of the preceding paragraphs, characterized in that it shows a pattern as well as embossments in the surface and that the embossments are in register with the image of the pattern.

26.—Board according to any of the preceding paragraphs, characterized in that the resin consists of a thermohardening resin, more particularly a melamine resin.

27.—Board, characterized in that it consists at least of a substrate which is at least formed of a gypsum-based and/or cement-based basic material layer with a resin-based covering provided on at least one side of the substrate, in the form of a laminate layer directly pressed onto the substrate, also named "DPL" (Direct Pressure Laminate), wherein the board, on at least two opposite edges, is provided with coupling means allowing to couple two of such boards to each other.

28.—Board according to paragraph 27, characterized in that the coupling means provide at least an overlap of material of the substrate.

29.—Board according to paragraph 27 or 28, characterized in that the coupling means provide at least a tongue and groove profile.

30.—Board according to paragraph 27, 28 or 29, characterized in that the coupling means are configured such that they, in the coupled condition, provide for a locking according to a direction in the plane of the coupled panels and perpendicular to the coupled edges, as well as in a direction perpendicular to the plane of the coupled boards.

31.—Board according to paragraph 32, characterized in that the coupling means are of the type which allows joining by means of turning and preferably comprises a groove with a further-extending rearmost lip, which is provided with a locking element (8).

32.—Board, characterized in that it consists at least of a substrate which is formed at least of a gypsum-based and/or cement-based basic material layer; that the basic material layer is provided with a reinforcement; that the board, on at least two opposite edges, is provided with coupling means which allow coupling two of such boards to each other, which are configured such that they, in the coupled condition, provide for a locking according to a direction in the plane of the coupled panels and perpendicular to the coupled edges, as well as in a direction perpendicular to the plane of the coupled boards; that the coupling means are made substantially or entirely in one piece in the basic material layer; and that the aforementioned reinforcement is present up into the coupling means, wherein the coupling means preferably are of the kind already described.

33.—Board according to paragraph 32, characterized in that the reinforcement is formed by fibers which are present in the material or the cement-based and/or gypsum-based basic material layer, more particularly are blended therein, and thereby thus also in the coupling means made in one piece therewith.

34.—Board, characterized in that it consists at least of a substrate which is formed at least of a gypsum-based and/or cement-based basic material layer; that the board, on at least two opposite edges, is provided with coupling means which allow coupling two of such boards to each other, which are configured such that they, in the coupled condition, provide for a locking according to a direction in the plane of the coupled panels and perpendicular to the coupled edges, as well as in a direction perpendicular to the plane of the coupled boards; that the coupling means are realized substantially or entirely in the board, and more particularly in the basic material layer; and that the board comprises a usage side which is untreated or is provided with a semi-finished covering.

35.—Board, characterized in that it consists at least of a substrate which is formed at least of a gypsum-based and/or cement-based basic material layer; that the board, on at least two opposite edges, is provided with coupling means which allow coupling two of such boards to each other, which are configured such that they, in the coupled condition, provide for a locking according to a direction in the plane of the coupled boards or panels and perpendicular to the coupled edges, as well as in a direction perpendicular to the plane of the coupled boards; that the coupling means are realized substantially in one piece or entirely in one piece in the basic material layer; and that the board is oblong with a length of at least 2.4 meters, wherein the aforementioned edges which comprise the aforementioned coupling means, are formed by the longitudinal edges, wherein the coupling means preferably are of the kind and form already described earlier.

36.—Board, characterized in that it consists at least of a substrate which is formed at least of a gypsum-based and/or cement-based basic material layer; that the board, on at least two opposite edges, is provided with coupling means which allow coupling two of such boards to each other, which are configured such that they, in the coupled condition, provide for a locking according to a direction in the plane of the coupled boards and perpendicular to the coupled edges, as well as in a direction perpendicular to the plane of the coupled boards; that the coupling means are realized substantially in one piece or entirely in one piece in the material of the board, and more particularly in the material of the aforementioned basic material layer; and that the board comprises a useful surface with a surface size of at least 0.5 square meters and still better at least 0.75 square meters, wherein the coupling parts preferably are of the kind and form already described above.

37.—Board, characterized in that it consists at least of a substrate which is formed at least of a gypsum-based and/or cement-based basic material layer; that the board, on at least two opposite edges, is provided with coupling means which allow coupling two of such boards to each other, which are configured such that they, in the coupled condition, provide for a locking according to a direction in the plane of the coupled boards and perpendicular to the coupled edges, as well as in a direction perpendicular to the plane of the coupled boards; and that the coupling means are provided with a means or element, more particularly in the form of a material layer and/or material strip, which provides for a sealing and/or for a tensioning force, which presses the panels with a tension, more particularly, so-called pretension, against each other.

38.—Board, characterized in that it consists at least of a substrate which is formed at least of a gypsum-based and/or cement-based basic material layer; that the board, on at least two opposite edges, is provided with coupling means which allow coupling two of such boards to each other, which are configured such that they, in the coupled condition, provide for a locking according to a direction in the plane of the coupled boards and perpendicular to the coupled edges, as well as in a direction perpendicular to the plane of the coupled boards; and that the coupling means are provided with a means or element, preferably in the form of a material layer and/or material strip, which provides for a temperature-activatable sealing.

39.—Board, characterized in that it consists at least of a substrate which is formed at least of a gypsum-based and/or cement-based basic material layer; that the board, on at least two opposite edges, is provided with coupling means which allow coupling two of such boards to each other, which are configured such that they, in the coupled condition, provide for a locking according to a direction in the plane of the coupled boards and perpendicular to the coupled edges, as well as in a direction perpendicular to the plane of the coupled boards; that the coupling means are realized substantially in one piece or entirely in one piece in the board, and more particularly in the basic material layer; and that in the proximity of the front side of the board, at the corner edge between the front side and at least one, and preferably both of said two edges, a chamfer is present in the form of a bevel or rounding.

40.—Board, characterized in that it consists at least of a substrate which is formed at least of a gypsum-based and/or cement-based basic material layer; that the board, on at least two opposite edges, is provided with coupling means which allow coupling two of such boards to each other, which are configured such that they, in the coupled condition, provide at least for a locking in a direction perpendicular to the plane of the coupled boards, preferably by means of a tongue and groove; that the coupling means are realized substantially or entirely in one piece in the basic material layer; and that the groove is bordered by a foremost lip and a rearmost lip, wherein the rearmost lip, distally seen, extends farther than the foremost lip, and wherein the rearmost lip is nailable and/or screwable and/or comprises appliances for facilitating the nailing and/or screwing, and/or is configured such that the board can be attached with the lower lip by means of a clip against an underlying surface or underlying structure.

41.—Board according to paragraph 40, characterized in that coupling means, as described before, are applied.

42.—Board according to any of the preceding numbered paragraphs, characterized in that the cement-based and/or gypsum-based basic material layer is formed of a substance bonding by means of a liquid, more particularly by hardening a gypsum-based and/or cement-based mass.

43.—Board according to any of the paragraphs 1 to 41, characterized in that instead of a cement-based and/or gypsum-based basic material layer, use is made of another mineral-based composed material and/or of a geopolymer.

Further, it is so that with cement-based boards, at least two issues manifest themselves.

A first problem is that these boards absorb moisture, water, respectively, due to the porosity of the board and due to capillary effect. Moreover, cement-based boards in their normal quality are very alkaline. They comprise many salts and, when taking in moisture and subsequently drying out, there is a migration of alkaline water and salts. In the case of façade boards, for which cement-based boards are often used, the cement-based substrate of the board is coated at the rear and upper sides with a lacquer or paint which is not 100% water-impervious, and there is natural ventilation, such that no issue will occur. In the case one wants to apply cement-based boards in a floor covering, more particularly a floor covering which is floatingly installed, wherein these boards are provided at the edges with mechanical coupling parts, such as milled coupling profiles, for coupling them to each other, such board, possibly on both sides, thus, the upper side and the underside, shall be provided with a coating which offers the necessary resistance against wear resistance and water absorption. As a result of the fact that such cement-based boards made as floor panels are lying on the subfloor, as well as due to the fact that such coatings will be present, no significant ventilation of the cement-based substrate can occur. The board can absorb moisture via the milled coupling profiles, and when drying, the alkaline water and the salts slowly will damage the primer, which finally leads to the coating coming loose.

A second problem is that standard cement-based boards have a relatively small internal bond. A standard cement-based board actually is systematically composed of various thin layers, which is a feature of the Hatschek production process mostly applied therewith. This results in a relatively small internal bond, such that it is not evident to consider such standard cement-based board as a floor panel, wall panel or ceiling panel, at least not when edges or profiles have to be provided thereon by a machining treatment. In fact, the small bond may lead to chipping at the edges. There is also a risk that, as a result of the weak internal bond, after milling of locking coupling means, gaping edges and cracks occur in the locking means, such that the floor is not performant during placement and after installation.

According to various aspects of the invention, herein below a number of solutions are presented, which are described in the numbered paragraphs following herein below:

44.—Board, more particularly a panel in the form of a floor panel and/or wall panel and/or ceiling panel, preferably of the type which is at least intended for interior application, wherein this panel comprises a basic material layer (or substrate) which is cement-based, which basic material layer as such can comprise one or more layers of cement-based basic material, wherein this panel preferably comprises a top layer, which as such can consist of one or more layers and gives a decorative appearance to the panel, and that the panel is provided with means which restrict moisture intake in the basic material layer, and/or with means which improve the internal bond in the basic material layer.

45.—Board, more particularly a panel, according to paragraph 44, characterized in that the aforementioned means which improve the moisture intake in the basic material layer and/or the internal bond in the basic material layer, are present according to at least one of the following possibilities:
- the means are applied at least in the proximity of the front side (or thus upper side in the case of a floor panel) and/or rear side (or thus underside in the case of a floor panel) of the basic material layer, more particularly at the respective surface of the basic material layer and/or directly thereunder;
- the means are applied almost exclusively or exclusively in the proximity of the front side (or thus upper side in the case of a floor panel) and/or rear side (or thus underside in the case of a floor panel) of the basic material layer, more particularly at the respective surface of the basic material layer and/or directly thereunder, whereas the respective means are not or almost not present in the middle of the basic material layer;
- the means are employed over the entire thickness of the basic material layer.

46.—Board, more particularly a panel in the form of a floor panel and/or wall panel and/or ceiling panel, preferably of the type which is at least intended for interior application, wherein this panel comprises a basic material layer (or substrate) which is cement-based, which basic material layer as such can comprise one or more layers of cement-based basic material, wherein this panel preferably comprises a top layer, which as such can consist of one or more layers and gives a decorative appearance to the panel, and that the panel comprises means (by which also provisions can be understood) which result in an improved adherence of the top layer and/or provide a reinforcement and/or lesser moisture intake, and wherein this panel in respect to these means preferably also meets paragraphs 44 and 45, characterized in that the panel shows one or more of the following characteristics (wherein in the case of a combination any not contradictory combination of two or more characteristics has to be considered a possibility according to the invention):
- the aforementioned means are of such a nature that they, at least on or next to a surface of the basic material layer, and preferably at least at the side where a top layer or backing layer is to be provided, seen in the thickness of the panel, provide for a zone which is alkaline-resistant and/or the alkaline resistance of which is improved;
- the aforementioned means are of such a nature that they, at least on or next to a surface of the basic material layer, and preferably at least at the side where a top layer or backing layer is to be provided, a reaction with water from the atmosphere and/or from the basic material layer takes place, (to this aim, for example, a "silres" product from the "Wacker" company can be applied, for example, silres BS1701, which can be applied in pure form and then reacts with the water;
- the aforementioned means make use of a means which enhances hydrophobicity, which means is incorporated into the cement-based basic material layer, preferably at least on or next to the surface thereof;
- the aforementioned means make use of a means which forms a filler and/or matrix of material which is water-impervious and/or water-repellent;
- the aforementioned means provide for the application of a silane- and/or siloxane-containing liquid, more particularly emulsion; (after application of the product, preferably as a coating, a hydrolysis is starting which breaks the emulsion, alcohol is released and a silicone matrix is formed which is water-repellent; herein, everything is alkaline-resistant); to this aim, for example, a product of the "silres" kind of "Wacker" can be applied, for example, in the case of silres BS3003 this can be applied with a 1:5 to 1:15 dilution in water and 0.1-3% of active material (preferably in the order of magnitude of 1%) to the total binder in the basic material layer;
- the means stated in the preceding 5 paragraphs is applied in that it is introduced into the substance, and more particularly wet matter (slurry) of which the cement-based material layer is formed, preferably during a Hatschek process;
- the aforementioned means stated in the first 5 paragraphs is applied via impregnation, more particularly after forming the cement-based basic material layer, for example, after a production according to the Hatschek process;
- the means stated in the preceding paragraph is applied via a coating technique, preferably by means of an excess of product, and/or preferably by means of a roller and more particularly by a twice wet on wet coating;
- the aforementioned means consist in adding so-called metal soaps (for example, Barlocher products); for example, to this aim use can be made of aluminum/magnesium/calcium/zinc stearate and/or zinc laurate long chain fatty acid tail+metal); preferably, this is added into the wet material mass (slurry paste, for example, at 0.1-1% of dry weight; the addition reduces capillary effect and moisture intake in the board);
- the aforementioned means consist in adding, an additive, respectively, of hydrophobic powder, for example, on the basis of silane or silicone resin (for example, DOW SHP50/60); preferably, it is added into the slurry paste, for example, at 0.1-2%, and preferably 0.25-0.5% of dry weight; this is more performant than stearates and silane/silicone emulsions;
- the aforementioned means consist in adding, an additive, respectively, of silicates with hydrophobic features, for example, Li-silicates; the effect thereof is double. On the one hand, CaOH is reacted away towards CaCO3 and in this manner the board is reinforced and made less sensitive to aging. On the other hand, a water-repellent effect is obtained;
- as an alternative for the aforementioned silane, polyurethane is applied, preferably water-based polyurethane, and more particular of the type polyester or polyether, and more particularly polycaprolactone; wherein this polyurethane preferably is applied together with a crosslinker as an adhesion promoter, more particularly a carbodiimide crosslinker; this is particularly useful with a DPL top layer, as such crosslinker will show its advantages best as an adhesion promoter between melamine and fiber cement board;

the aforementioned means consist in the use of a crosslinker, preferably carbodiimide, for forming an improved connection between a fiber cement board and a top layer, more particularly melamine-based top layer;

the aforementioned means (by which products can be understood as well as measures or operations which then offer a result at the product) provide for one of the following possibilities, or a combination thereof:

means which provide for a reduction of the porosity of the basic material layer and/or a reduction of the capillary effect thereof and/or an increase of the density thereof;

the use of cement (in the slurry) with a smaller PSD (Particle Size Distribution), preferably smaller than usual in commercial cement boards;

the use of comparatively more cement than usual in commercial cement boards;

increasing the amount of silica or other pozzolane material in comparison to commercial cement boards;

impregnating the cement-based basic material layer with a low-viscosity dispersion which reinforces the basic material layer or thus board or substrate, for example, by means of acrylate or epoxy or isocyanate; the impregnation may take place by, for example, vacuum and/or pressure;

in the case of a Hatschek process, increasing the interlaminary bond, for example, by processing wetter and applying a Hatschek cylinder or sieve which is somewhat coarser than with the usual techniques (larger surface/mm$^2$) and/or by, for example, applying a binding agent between each cement layer, for example, by spraying;

after the Hatschek process (or any other basic shaping process) and prior to the press and/or prior to hardening, coating and/or impregnating with a thermoplastic-based substance (dispersion); herein, the exothermal reaction of the cement renders the thermoplastic liquid, such that it can penetrate into the entire board, or anyhow at least at the surface thereof, where, for example, the top layer has to be provided;

applying one or more of the following chemical products in the basic material layer: acrylic and metacrylic (co)polymers, PVA or EVA polymers, styrene/acrylic acid ester copolymers, silane or siloxane of silicone.

47.—Board according to any of the paragraphs 44 to 46, characterized in that the herein above-mentioned means, and more particularly the therein-applied products which result in hydrophobic features, as far as not contradictory with the preceding, are applied alternatively either by providing them in the mass of the board or thus of the cement-based basic material (in the slurry), or by impregnation and/or by providing them in the form of a pre-primer, or by providing a combination thereof (via this technique, the edges of the panels can be treated as well, in particular the surface of coupling parts formed thereon, in particular milled coupling parts allowing a mechanical locking).

It is clear that according to the invention preferably a top layer provided on the basic material layer is present, which as such can consist of one or more layers.

The panel thicknesses of the finished products can be at choice, however, in the case of floor panels the overall thickness preferably is less than 8 mm and still better less than 6 mm, and possibly even less than 4 mm.

In the case of all embodiments mentioned herein above as well as below and in the claims, in the case of a cement-based basic layer preferably use shall be made of fiber cement, thus "fiber cement board", in Dutch sometimes also called cement fiberboard.

There, where this is not contradictory to the description and claims, the cement-based substance according to the invention may also be replaced by other mineral-based substances, such as, for example, calcium oxide board.

It is noted that the various independent aspects according to the invention can be combined at choice and that all mathematical combinations which do not include any contradictions, have to be considered inventions. Further, it is also possible to detach all characteristics of dependent claims as such from the independent claim to which they refer and to combine them with the characteristics of one or more of the other independent claims, this as far as this does not result in contradictory characteristics. Here, too, all mathematical combinations have to be considered disclosed.

The invention also relates to a method of manufacturing such board, which method can be derived from the composition of the board described in the claims.

Regarding the use of lacquers, paints, coatings and the like, according to the invention preferably use is made of one or more of the following possibilities, wherein this primarily is intended for being applied with cement-based boards, in particular with fiber cement boards:

Backside lacquer:

Water-based PVDC lacquer, for example, Haloflex 202;

UV-curable so-called clearcoat lacquers (as alkali-resistant binder)

Waterbased preprimer with solid components of 20-60% and application weight of 20-600 g/m$^2$;

to be applied by brush, roller, spraying, curtain coating and/or impregnation by means of vacuum or pressure;

chosen from the following suitable primers: acrylic and methacrylic (co)polymers, PVA or EVA polymers, styrene/acrylic acid ester copolymers;

the primer comprises hydrophobic additives, for example, so-called metal soaps, fluorinated additives, silanes, siloxanes and the like;

the primer comprises fillers, for example, aluminosilicates, silicates, alkaline-earth metal carbonates, calcium carbonates;

the primer comprises pigments, more particularly alkali-resistant pigments or metal oxides;

the primer comprises crosslinkers, for example, isocyanates, silanes and the like, which effect an extra crosslinking with the mineral board;

UV primer:

application weight 20-40 g/m$^2$ with solid components of 100%;

UV acrylic lacquer with alkali-resistant binder;

UV acrylic resin, preferably with a functional isocyanate group;

with an addition of a crosslinker, more particularly isocyanates, silanes and the like, or creation of a two-component curing mechanism; it is noted that isocyanate will chemically react with OH, $NH_2$ and other functional groups in the cement fiberboard.

UV sealer:

application by means of a so-called putty machine, wherein all small openings and gaps are filled, whereby it is made sure that a moisture barrier is created between the fiber cement board and the following layers, for example, white lacquers;
application weight 20-50 g/m², 100% solids;
Application of other (following) layers:
UV white lacquer;
inkjet receiver coating;
digital print;
protective anti-abrasive lacquers, which contain, for example, aluminum oxide.

All lacquers preferably are alkaline-resistant, as after installation and during cleaning, there is always a small risk that water, which contains salts of the fiber cement board, can penetrate through the lacquer layers.

The invention, as far as this relates to cement-based boards, more particular fiber cement boards, also relates to boards, more particular panels, which meet well-defined specifications, whereby they are more suitable for interior applications, such deviating from the specifications which commonly are applied for façade boards.

According to the invention, the boards, panels, respectively, then preferably meet one or more of the specifications stated in the following table, wherein combinations at choice are possible. Herein, a comparison is made between the specifications of common fiber cement boards, which usually are applied for exterior façades, and fiber cement boards, of which the specifications now according to the invention are chosen such that they can be usefully applied as floor panels, in particular for interior applications. The boards are also suitable for wall and ceiling applications, considering that those mostly have less strict requirements than floor panels.

geous to work with boards which meet the specs stated herein above according to the invention.

BRIEF DESCRIPTION OF THE DRAWINGS

FIG. 1 schematically represents a preferred embodiment of such board 1, wherein it is attached as a wall covering board or wall panel against a lath structure 2.

DETAILED DESCRIPTION OF PREFERRED EMBODIMENTS OF THE INVENTION

The basic material layer 3 is a gypsum or fiber cement board. On top of this, a DPL layer 4 is pressed, which as such comprises one or more resin-impregnated sheets. Possibly, a counter layer 5 is provided. Compressing usually is performed at an increased temperature.

The coupling means 6 preferably are of the type which locks in two directions D1 and D2, as indicated. Preferably, they are also of the type which allows joining by means of a turning movement R.

As represented, herein preferably use is made of a longer rearmost lip 7, which is provided with a locking element 8.

At the front corner edge a chamfer 9 can be provided.

A preferably strip-shaped element 10, preferably provided at the locking element 8, can result in a pretension and/or result in a seal and/or result in a heat-activatable fire-retarding joint.

A recess 11 offers space for the head of a nail or the like, such that the whole is nailable or screwable.

|  | Not coated composition as a façade board (prior art) | Not coated board according to the invention for floor application | Coated board according to the invention for floor application |
| --- | --- | --- | --- |
| Density (kg/m³) | 1800-1850 | 1870-2000 | 1870-2000 |
| Tensile strength (N/mm²) | <1.3 | >1.4 and preferably >1.5 | >1.4 and preferably >1.5 |
| Pull-off strength (N/mm²) | <1.5 | >1.6 and preferably >1.8 | >1.6 and preferably >1.8 |
| 24 h H2O absorption | 5-10% | <5%, preferably <3%, and still better <1.5% | <5%, preferably <3%, and still better <1.5% |
| max. H2O absorption | +13% and can go to +25% | <11%, preferably <10%, and still better <8% | <6%, preferably <3%, and still better <1.5% |
| Dimensional stability | +/−0.25-0.5% | <+/−0.15%, and better <+/−0.1% | <+/−0.05%, and better <+/−0.04% |
| Delta thickness tolerance for panel of 6 mm | 0.25-0.6 mm | <0.2 mm and preferably <0.1 mm | <0.2 mm and preferably <0.1 mm |

Preferably, the boards according to the invention indeed are subjected to a grinding treatment before providing them with a coating.

The following criteria can also be applied:

|  | Coated composition as façade board | Coated board according to the invention |
| --- | --- | --- |
| Pull-off and tear strength | Between 10 and 25 | >25, preferably >30 and still better >35 |

One or more of the above-mentioned specifications (specs) of the boards according to the invention thus will preferably be maintained. Primarily, they are substantially intended for boards which have to be provided with lacquer or are provided with lacquer. With other coatings, too, for example, a melamine layer pressed thereon, it is advanta- Of course, the present invention is not limited to the example represented in the FIGURE.

The most intended applications of the invention are floor panels and wall panels. With wall panels, this preferably are room-high panels which are provided with coupling parts at their edges, which edges are to be mounted vertically, said coupling parts being, for example, of the type as represented in the accompanying FIGURE. With floor panels, this preferably relates to smaller panels, which are provided at their four edges with coupling parts allowing a mutual coupling and locking, in order to be able to form, as usual, a so-called floating floor covering. Wall panels of fiber cement have the great advantage to be fire-resistant, whereas floor panels of this material will hardly expand as a result of temperature changes and the like.

The invention also relates to the obtained substrates as such, without these being already finished further by means of top layers or the like.

The invention claimed is:

1. A board, comprising a substrate formed at least of a gypsum fiber board with a compressive strength of at least 30 kg/cm² or a fiber cement board with a compressive strength of at least 30 kg/cm², and a resin-based covering provided on at least one side of the substrate, in the form of a laminate layer directly pressed onto the substrate;
   wherein the resin-based covering comprises a first material sheet and a second material sheet;
   wherein the first material sheet comprises a first paper sheet impregnated with resin;
   wherein the second material sheet comprises a second paper sheet impregnated with resin;
   wherein the resin of the first material sheet is a thermohardening resin;
   wherein the resin of the second material sheet is a thermohardening resin;
   wherein the first paper sheet comprises a printed decor;
   wherein the second material sheet is provided onto the first material sheet;
   wherein the first material sheet is bonded onto the substrate by a resin bond provided by the thermohardening resin of the first material sheet;
   wherein the first material sheet is bonded to the second material sheet by the thermohardening resin of the first material sheet and the thermohardening resin of the second material sheet;
   wherein the board is a floor panel, a wall panel or a ceiling panel;
   wherein the board has a decorative appearance;
   wherein the substrate comprises reinforcement fibers, said reinforcement fibers consisting of wood fibers, wherein the reinforcement fibers are provided substantially over an entire thickness of the substrate;
   wherein said reinforcement fibers are blended in material of the gypsum fiber board or the fiber cement board;
   wherein the thermohardening resin of the first material sheet adheres to the reinforcement fibers of the substrate to form a connection;
   wherein the board, on at least two opposite edges, comprises coupling parts arranged for coupling two of such boards to each other, wherein the coupling parts are configured, in a coupled condition, to provide for a locking in a direction in a plane of the coupled boards and perpendicular to the coupled edges, and in a direction perpendicular to the plane of the coupled boards; wherein the coupling parts are made substantially or entirely in one piece in the substrate; and wherein the wood fibers extend into the coupling parts;
   wherein the coupling parts are provided with a material layer or material strip, which provides for a sealing of the coupling parts against absorption of moisture;
   wherein the resin bond is continuously present from on the resin-based covering up into the gypsum fiber board or the fiber cement board;
   wherein the resin of said resin bond extends at least up to a depth in said gypsum fiber board or the fiber cement board which is at least 0.5 millimeters.

2. The board of claim 1, wherein the laminate layer is directly pressed onto the substrate with a pressure of more than 25 kg/cm².

3. The board of claim 1, wherein the gypsum fiber board or the fiber cement board has a compressive strength of at least 70 kg/cm².

4. The board of claim 1, wherein the gypsum fiber board or the fiber cement board has a compressive strength of 90 kg/cm² or more.

5. The board of claim 1, wherein the laminate layer is directly pressed onto the substrate with a pressure of more than 30 kg/cm², and that the compressive strength of the board is higher than value pressure for directly pressing the laminate layer onto the substrate.

6. The board of claim 1, wherein the resin-based covering is situated at that side of the board which is intended for forming a front side.

7. The board of claim 1, wherein the substrate, at the side on which the resin-based covering is provided, is free from a cover sheet, such that the resin-based covering then is present directly on said gypsum fiber board or the fiber cement board.

8. The board of claim 1, wherein the substrate, at least on the side on which the resin-based covering is provided, comprises a cover sheet, which includes one or more layers of paper or cardboard, and wherein the resin-based covering is provided directly or indirectly on the paper.

9. The board of claim 8, wherein the paper or cardboard layer has a thickness smaller than or equal to 0.18 millimeters.

10. The board of claim 1, wherein the substrate is provided with an adherence-increasing layer, which improves an adherence of the resin-based covering.

11. The board of claim 1, wherein in an upper side thereof a relief is provided, formed by embossments.

12. The board of claim 1, wherein the board shows a pattern and defines embossments in a surface thereof, and wherein the embossments are in register with an image of the pattern.

13. The board of claim 1, wherein the thermohardening resin of the first material sheet is melamine.

* * * * *